Feb. 8, 1927.

R. E. PIERCE 1,616,507

MEANS FOR MEASURING THE MARGIN OF OPERATION OF TELEGRAPH CIRCUITS

Filed Nov. 20, 1924

INVENTOR
R. E. Pierce
BY
ATTORNEY

Patented Feb 3, 1927.

1,616,507

UNITED STATES PATENT OFFICE.

RALPH E. PIERCE, OF LARCHMONT, NEW YORK, ASSIGNOR TO AMERICAN TELEPHONE AND TELEGRAPH COMPANY, A CORPORATION OF NEW YORK.

MEANS FOR MEASURING THE MARGIN OF OPERATION OF TELEGRAPH CIRCUITS.

Application filed November 20, 1924. Serial No. 751,143.

This invention relates to electrical measuring systems and particularly to means for measuring the range of current through which the receiving relay of a telegraph system will operate under various line conditions.

After a telegraph circuit, such as a duplex or half-duplex system, has been set up for operation, it has been found difficult at times to maintain the stability of operation of such system owing to effects produced upon the circuit either by internal or external causes. Thus, for example, after a circuit has been set up in the morning for the day's traffic and has been properly balanced it may later be found that due to a change in the line insulation the circuit is not balanced and the receiving relay will be affected by current sent out by the transmitter at the same end of the line as the said receiving relay.

While various devices have been produced for measuring line balance, speed of failure and other factors in connection with telegraph circuits, none of these measure or determine the limits of current within which a receiving relay will operate to correctly retransmit the signaling impulses from the line circuit to the loop or terminal circuit with which the said receiving relay is connected.

It is the object of this invention to measure the margin of operation of telegraph circuits.

Figure 1:
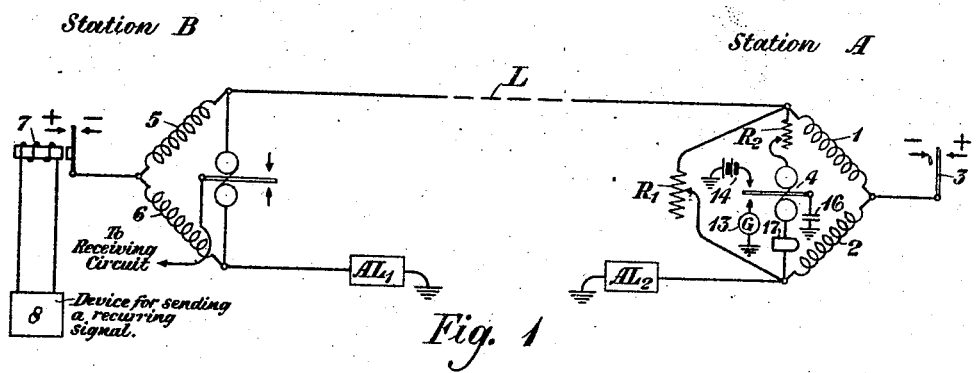
Figure 2:
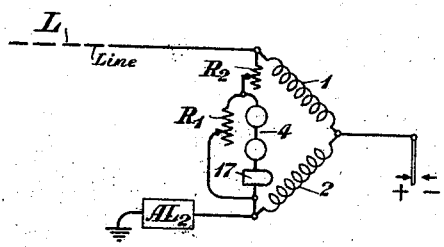
Figure 3:
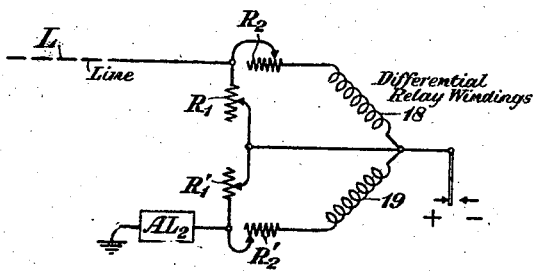

This invention will be apparent from the following description when read in connection with the attached drawing, of which Figure 1 shows schematically a form of the invention in which the margin of operation is determined by varying the current through the receiving relay until failure of the said relay to translate signals is indicated by a failure-meter; Fig. 2 shows a form of the invention operating on the same principle as Fig. 1, but employing a slightly different type of calibrated shunt in which the shunt element is in parallel with the receiving relay and ammeter only; and Fig. 3 shows the application of the invention to a differential relay.

In the arrangement shown in Fig. 1 the line L is terminated by two bridged polar duplex circuits. At station A this comprises the ratio arms 1 and 2 to the apex of which is connected the armature of the transmitting pole changer 3. Across the outer ends of the ratio arms the receiving and measuring apparatus is connected. This comprises the polarized receiving relay 4, having in series therewith a variable resistance $R_2$, which is one of the elements of a universal shunt, and a variable resistance $R_1$ which is the other element of the shunt, connected in parallel with the relay 4 and the resistance $R_2$ combined. An ammeter 17 may be connected in the relay circuit to indicate the magnitude of the operating current. A battery 14 is connected with one contact of the relay and a grounded galvanometer with the other contact. The armature of the relay is connected with the grounded condenser 16. When the armature touches its upper contact the condenser will receive a complete charge from the battery 14. When the armature moves to its lower contact the condenser will be discharged through the galvanometer 13. When a steadily recurring signal is impressed upon the relay the armature will follow the signal, causing the condenser to be charged by the source 14, and then discharging it through the galvanometer 13. Under such condition the needle of the galvanometer will be moved to a certain point upon its scale and will remain at that point so long as the armature of the relay follows the recurring signal. Since any failure of the armature to so act will be manifested by a falling back of the galvanometer needle, the arrangement constitutes a simple and effective means for determining when the relay fails to follow the signals. This arrangement, which, per se, forms no part of the invention is disclosed in the copending application of H. Nyquist, Serial No. 427,903, filed December 2, 1920. The line L and its corresponding artificial line $AL_2$ are likewise connected with the outer ends of the arms 1 and 2.

At station B the terminal apparatus is substantially that normally used in a bridged duplex circuit comprising ratio arms 5 and 6, a receiving relay and a balancing artificial line. Connected with the apex of the arms 5 and 6 is a transmitting pole changer 7. This pole changer has connected therewith a device 8 for sending a recurring signal, such, for example, as the letter C. The resistances $R_1$ and $R_2$ at station A are so proportioned that regardless of their setting the impedance of the terminal circuit is substantially unchanged. It will of course be apparent that variations in the setting of these resistances will change the magnitude of the current flowing through the receiving relay 4, without appreciably changing the magnitude or waveshape of the current in the line. A preferred form of shunt is one in which both resistances may be varied by the same control mechanism to automatically keep the impedance constant. Furthermore, if the shunt is so calibrated as to indicate the current flowing through the relay, the meter 17 may be dispensed with.

The manner in which the circuit described above functions to measure the margin of operation of the relay 4 is as follows: A recurring signal is transmitted by the pole changer 7 over the line L, the transmission being controlled by the device 8. The current representing the signals will flow through the terminal circuit at station A to ground at the artificial line $AL_2$. The magnitude of the current through the branch that includes the receiving relay 4 will be determined by the setting of the resistances $R_1$ and $R_2$. Starting with the resistances set at the points which produce the maximum current flow through the relay 4, which will be evidenced by the maximum deflection of the ammeter 17 or by the scale of the shunt, the setting of the resistances is varied until the current through the relay 4 has been reduced to a value so low that the relay fails to reproduce accurately the received signal which will be indicated by the galvanometer 13, as described hereinbefore. The arrangement shown gives a positive indication of the margin of operation of the relay 4 in response to signals transmitted to it over the line L from the distant station. This result may be compared with the results when different conditions exist on the same circuit as, for example, when an intermediate composite set has been inserted in the circuit or when the line is unbalanced by adjusting the artificial line $AL_1$. The shunt may be calibrated to indicate directly the magnitude of the current flowing through the receiving relay circuit when failure occurred.

The arrangement shown in Fig. 2 differs only structurally from that shown in Fig. 1. In Fig. 2 the receiving relay 4 is connected across the outer ends of the arms 1 and 2 in series with the variable resistance $R_2$ and a milammeter 17. A second variable resistance $R_1$ is connected across only the relay 4 and the ammeter 17. The arrangement of Fig. 2 operates in substantially the same way as that shown in Fig. 1. A recurring signal would be transmitted over the line L and the setting of the resistances $R_1$ and $R_2$ would be varied until the point is reached where the relay 4 ceases to respond to the signaling current. The current flow through the relay 4, which is indicated by the ammeter 17, represents the limit of operation of the relay.

The arrangement shown in Fig. 3 represents the application of the invention to a differential relay terminal circuit. One of the windings 18 of such a relay is connected with the line L through the variable resistance $R_2$, and a variable resistance $R_1$ is connected in parallel with the winding 18 to the resistance $R_2$. In like manner the winding 19 is connected with the artificial line $AL_2$ through the resistance $R_2'$ and the latter winding and resistance are shunted by the resistance $R_1'$. By varying these resistances during the time of reception of signals from the line L the current through the differential relay may be varied without of course varying the impedance of the terminal circuit. The margin of operation of this relay may thus be determined.

In Figs. 2 and 3, for purpose of simplicity, I have omitted a representation of the armature and the failure-meter comprising the condenser, source of current and galvanometer but it is to be understood that such elements form a part of these circuits and that they would be connected therein in substantially the same manner in which they are connected with the circuit constituting Fig. 1.

It will be seen that by means of the arrangements shown in figures of the drawing the margin of operation of a receiving relay of any type in a system adapted either for duplex or half-duplex operation may be quickly and accurately determined. The simplicity of the arrangement combined with the fact that the impedance of the line is not varied during the course of measurement, renders the invention particularly useful in making routine maintenance tests upon telegraph systems.

While the invention has been disclosed as embodied in certain particular forms it is of course capable of embodiment in other forms without departing from the spirit and scope of the appended claims.

What is claimed is:

1. In a system for determining the margin of operation of a telegraph circuit, the combination with a source of signaling current of a terminal circuit having a receiving relay, a universal shunt controlling the current flowing through said relay and means to indicate failure of said relay to respond to the current as thus controlled.

2. In a system for determining the margin of operation of a telegraph circuit, the combination with a source of signaling current of a terminal circuit having a receiving relay, means to vary the current through the said relay without substantially changing the impedance of the terminal circuit, and means to indicate failure of said relay to respond to the current as thus controlled.

3. In a system for determining the margin of operation of a telegraph circuit, the combination with a source of signaling current arranged to transmit a steadily recurring signal, of a terminal circuit to which said signaling current is applied, the said terminal circuit comprising a receiving relay responsive to said current, a universal shunt to vary said current without substantially changing the impedance of the said terminal circuit and means to indicate failure of said receiving relay to retransmit signals.

4. In a system for determining the margin of operation of a telegraph circuit, the combination with a line circuit of a terminal circuit having means for applying a signaling current to the said line circuit, and a second terminal circuit having a receiving relay, a universal shunt and means to indicate failure of the said relay to translate signals according to the said signaling current.

5. In a system for determining the margin of operation of a telegraph circuit, the combination with a line circuit of a duplex terminal circuit having means for applying a steadily recurring signal to the said line circuit for transmission thereover, and a second duplex terminal circuit having a receiving relay, a universal shunt to vary the current through the said relay without substantially changing the impedance of the terminal circuit, and means to indicate the failure of the said relay to translate said recurring signal.

6. The method for determining the margin of operation of a telegraph circuit which consists in receiving a steadily recurring signal, varying the magnitude of the signal current until failure of reception occurs, without affecting substantially the impedance of the receiving circuit, and indicating such failure to receive said signals.

7. The method for determining the margin of operation of a telegraph circuit which consists in generating and transmitting through or over a medium a current representing a steadily recurring signal, receiving the said current and varying the portion thereof flowing through a responsive device without substantially affecting the impedance of the receiving circuit, and indicating the margin of operation of the responsive device.

In testimony whereof, I have signed my name to this specification this 18th day of November, 1924.

RALPH E. PIERCE.